United States Patent [19]

Darilek

[11] Patent Number: 4,652,876

[45] Date of Patent: Mar. 24, 1987

[54] REMOTE SWITCH POSITION DETERMINATION USING CONSTANT CURRENT SIGNALING

[75] Inventor: Glenn T. Darilek, San Antonio, Tex.

[73] Assignee: Mobil Oil Corporation, New York, N.Y.

[21] Appl. No.: 772,083

[22] Filed: Sep. 3, 1985

[51] Int. Cl.[4] .............................................. G01V 1/00

[52] U.S. Cl. .................................. 340/853; 340/856; 166/250

[58] Field of Search .................. 340/853, 856, 825.77, 340/825.18, 870.27, 686, 540; 166/250, 65.1, 66; 307/116, 130, 131

[56] References Cited

U.S. PATENT DOCUMENTS 3,309,521 3/1967 Bargainer, Jr. .
3,394,364 7/1968 Bruce et al. .
3,427,580 2/1969 Brock .
3,464,058 8/1969 Gollwitzer .
3,484,559 12/1969 Rigby .......................... 340/825.77
3,550,090 12/1970 Baker, Jr. et al. .
3,689,876 9/1972 Kampfer .
3,991,611 11/1976 Marshall, III et al. .
4,027,286 5/1977 Marosko .
4,035,763 7/1977 Cowles .
4,103,337 7/1978 Whitside .
4,107,644 8/1978 Howlett .
4,136,327 1/1979 Flanders et al. .
4,178,579 12/1979 McGibbeny et al. .
4,215,425 7/1980 Waggener .
4,268,822 5/1981 Olsen .
4,459,760 7/1984 Watson et al. .
4,580,138 4/1986 Morrison ........................ 340/825.36

FOREIGN PATENT DOCUMENTS 1539805 2/1979 United Kingdom .

*Primary Examiner*—Charles T. Jordan
*Assistant Examiner*—John W. Eldred
*Attorney, Agent, or Firm*—Alexander J. McKillop; Michael G. Gilman; Charles J. Speciale

[57] ABSTRACT

A system and method for sensing the status of a plurality of valves by detecting the total current flowing through a network of constant current devices connected in series with a plurality of limit switches responsive to the open and closed positions of the valves. The system uses a binary constant current encoding network to provide a total current that is a unique binary weighted indication of which switches are closed. The system includes a current measurement circuit that converts the current to a voltage, filters out noise and amplifies the voltage for input to an analog to digital converter. The output of the analog to digital converter is then decoded by a logic hardware or by a computer to derive a digital output indicative of the position of the switches. A bipolar voltage source energizes the constant current encoding network and interacts with the current measurement and decoding circuits to ensure a sufficient voltage level for constant current operation.

43 Claims, 11 Drawing Figures

REMOTE SWITCH POSITION DETERMINATION USING CONSTANT CURRENT SIGNALING

BACKGROUND OF THE INVENTION

1. Field of the Invention

This invention relates to telemetering information from a remote location to a control station. More particularly, the invention relates to the monitoring at a local test station the position of switches located at the wellhead of a subsea petroleum well.

2. Description of the Prior Art

In the control and monitoring of some types of processes or instrumentation, the position of several remote switches or contact closures must be monitored. For example, to monitor the production of one type of subsea petroleum well, the position of four valves on the subsea wellhead structure must be monitored at an accessible location such as on the sea surface. Usually there are two limit switches associated with each valve, one to indicate the fully opened position and another for the fully closed position. Monitoring the position of these eight limit switches normally would require nine conductors including one common conductor and one conductor for each switch. Cable connectors are then required to have the same number of contacts.

However, due to the subsea environment of high pressure and salt water and the requirement to install the connectors using divers, submersible vehicles or other means, it is desirable to minimize the number of conductors and connector contacts for reliability and installation reasons. In addition, due to connector or cable corrosion, the value of the circuit impedance can change with time or from one installation to the next. Thus, it is desirable to utilize only a single pair of electrical conductors between the subsea location and the surface. Furthermore, the use of alternating current electrical signals for monitoring is highly desirable to minimize electrolysis and subsequent corrosion of the conductors or connectors. Also, for long term reliability reasons, it is not desirable to use a source of power at the wellhead structure. It is likewise desirable to minimize circuit complexity for reliability reasons.

One prior art system for monitoring the status of control valves and switches utilizes passive resonant circuitry such as that disclosed in U.S. Pat. No. 3,550,090 issued to Baker, Jr. et al., U.S. Pat. No. 4,027,286 issued to Marosko and U.S. Pat. No. 4,268,822 issued to Olsen. In these systems, frequency selective resonant circuits are placed near the individual switches. The resonant circuits are connected or disconnected or the resonant frequencies are changed by the closure of the switches. Decoding circuitry responsive to the change in resonance of the switch circuits is used to indicate the status of the switches. The coding and decoding circuitry is very complex. In addition, in the U.S. Pat. No. 4,027,286 system, the bandwidth of the conductive coupler limits the channel capacity so that the status of only six switches can be determined.

Another prior art telemetry system is disclosed in U.S. Pat. No. 4,136,327 issued to Flanders et al., wherein a two conductor line serves a dual purpose of supplying power into the borehole and communicating sensor data back up to surface. In the Flanders et al. system, phase modulation is used to transmit a binary encoded signal to the surface that is received by a digital computer. In this type of system, the remote system electronics is complex, which may degrade reliability in a subsea environment.

U.S. Pat. No. 4,459,760 issued to Watson et al., discloses a technique using serial encoding circuitry to convert digital signals into a frequency shift keyed modulated signal for transmission on a two conductor wire line. The circuitry required for this technique is quite extensive, requiring enclosures that are relatively inexcessible at the wellhead.

U.S. Pat. No. 4,103,337 issued to Whiteside, discloses a data transmission system wherein a digital processor generates a data request signal across a two wire transmission line to a remote sensor. Sensor interface circuitry includes an analog to pulse width converter and a decoder which generates a pulse width signal in response to the data signal indicative of the value of the analog signal generated by the sensor. A pulse width to digital converter converts the data signal to digital form which is terminated in response to the pulse width signal from the sensor interface. The signal stored in the pulse width to digital converter is transmitted to the digital processor to indicate the value of the parameter being sensed.

SUMMARY OF THE INVENTION

The system of the present invention senses the position of a plurality of remote valve switches by utilizing electrical current encoding in which each remote switch connects a binary weighted constant current device across a two conductor line that connects the switches at the wellhead to a local test station at the surface or at a subsea atmospheric control system (SAS). The total current transmitted from the constant current encoding network is measured and decoded by a current measurement means and a decoding means located at the surface to indicate each switch position. In the surface or SAS electronics, a voltage source supplies power to the two conductor line. The total binary weighted current measured by the current measurement means is decoded into a unique indication of the status of the switches. This embodiment requires a DC voltage on the cable. In another embodiment, matching constant current devices can be connected with opposite polarity in series with the first constant current devices to allow AC voltage and current measurement circuitry to be used.

In another embodiment, half the switches have constant current devices connected in the opposite polarity as the devices connected to the other half of the switches. This configuration requires a bipolar voltage source and current measurement circuit. If AC operation is desired, half of the limit switches should be normally open and the remaining half should be normally closed. In each of the embodiments, the voltage source can interact with the current measurement circuit to ensure operation at a voltage level sufficient for constant current operation.

Various constant current devices may be used in the practice of the present invention. Two terminal current regulator diodes, three terminal current regulators and digitally programmed current regulators are examples of some of the devices that can be used. These devices are used when the maximum encoding current is less than ten milliamperes. Examples of higher currents devices include a three terminal voltage regulator having a external resistor, a device using discrete transistors connected in a feedback configuration, and a power field-effect transistor wherein the gate to source voltage of the transistor is maintained constant.

The current return from the constant current devices is measured by the measurement circuit and converted to a digital form by the decoding circuit to indicate which valve switches are closed. The current measurement means includes a converting and amplifying circuit to convert the current to a voltage at the proper level. A filter may also be included to filter out noise and interference. The decoding circuit includes an analog to digital converter to convert the voltage to digital form. The decoding may then be performed by external gating circuitry or by a computer.

DETAILED DESCRIPTION OF THE INVENTION

Figure 1:
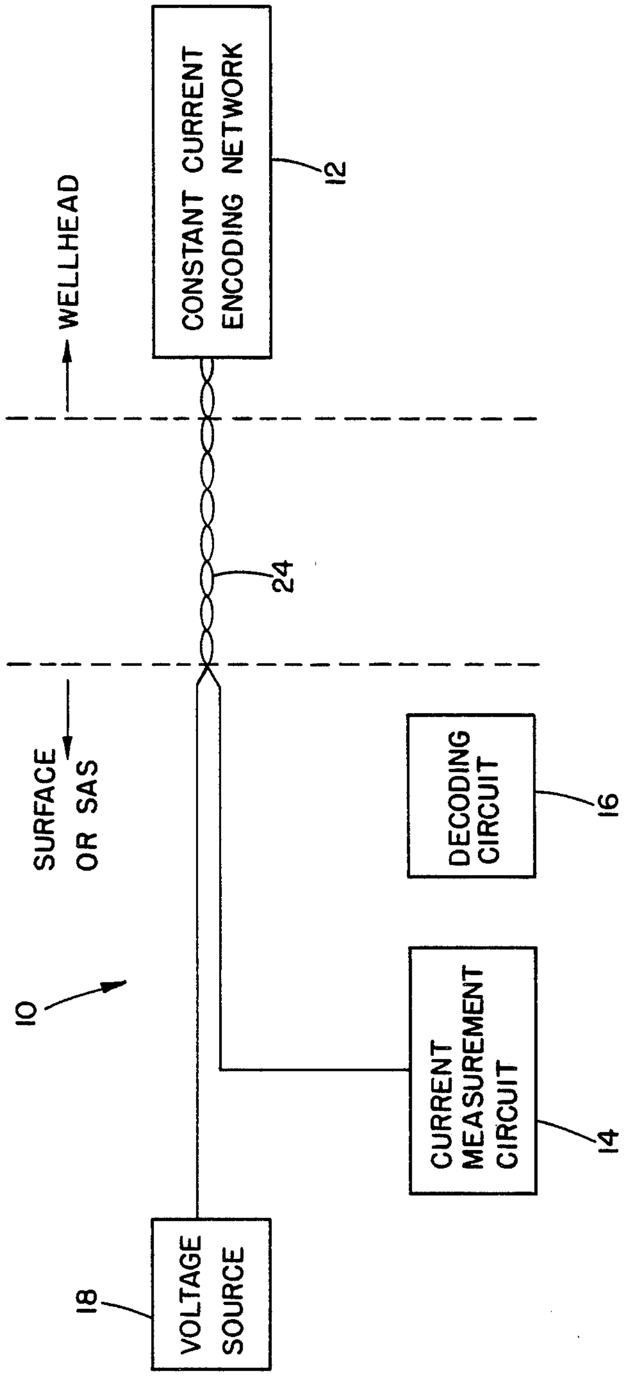
FIG. 1 is a block diagram of the system of the present invention.

FIG. 1 is a block diagram of the system 10 of the present invention which includes a constant current encoding network 12, a current measurement circuit 14, a decoding circuit 16 and a voltage source 18. The current encoding network 12 is located at the remote wellhead and includes a unique arrangement of switches and constant current devices to be described hereinafter. The total current of the constant current encoding network 12 is transmitted to the surface or SAS by a two conductor line 24 to current measurement means 14. The decoding circuit 16 decodes the output of the current measurement means 14 to determine which switches are closed. The voltage source 18 supplies power to the encoding network 12 and may also interact with the measurement means 14 to maintain the constant current operation.

Figure 2:
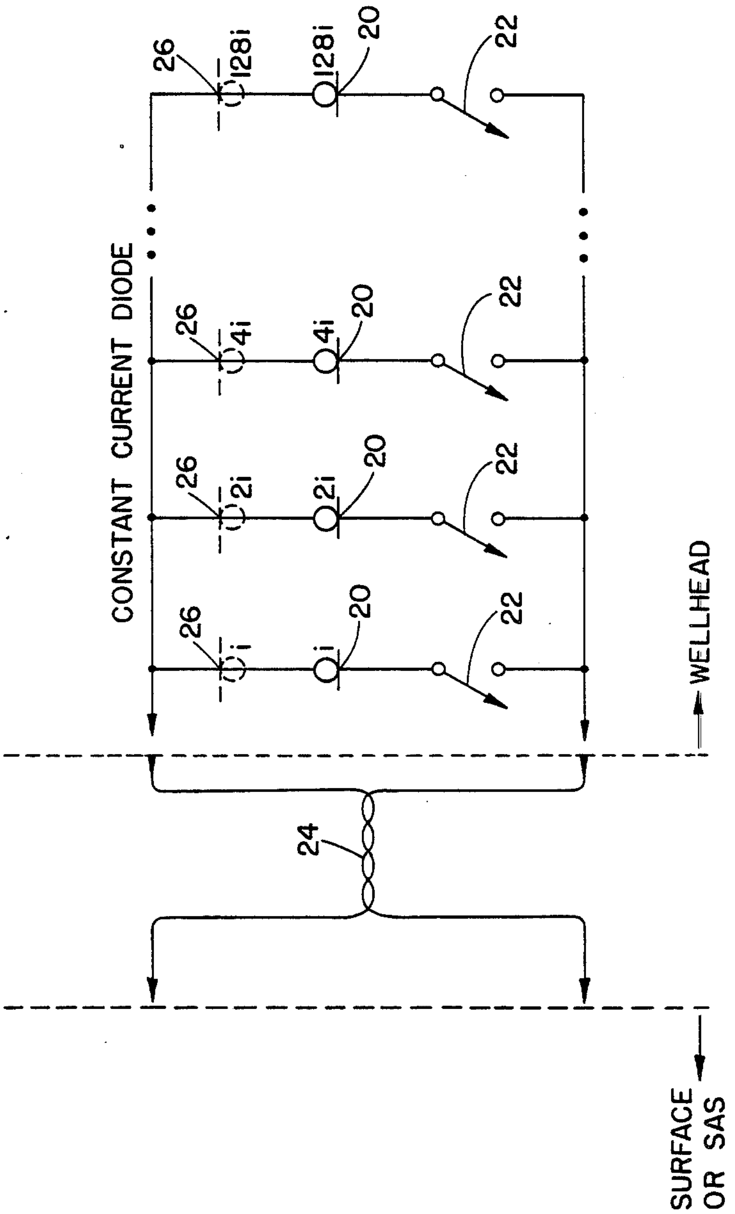
FIG. 2 is a schematic of one embodiment of the constant current encoding network.

FIG. 2 shows one embodiment of the constant current encoding network 12. Constant current devices 20, each with a distinct binary current weighting, are placed in series with limit switches 22. The limit switches 22 are responsive to the open and closed position of a plurality of valves (not shown) located on the wellhead. The binary weighting is arranged so that the current value for each device 20 is twice the value for the preceding device 20. Generally there are four valves that must be monitored. Two limit switches 22, such as magnetic reed switches, are connected to each valve. One switch will detect when the valve is fully open and the other switch will detect when the valve is fully closed. Thus, for a system having four valves there will be eight limit switches 22. The current weighting as shown in FIG. 2 is indicated by i, 2i, 4i for the first three devices 20 and 128i for the eighth device 20, the fourth through seventh devices 20 being correspondingly binary weighted but not shown.

Each of these series circuits are connected in parallel with the two conductor line 24 connecting the wellhead components to the surface or SAS. Thus, the total current transmitted to the surface or SAS will be a unique binary weighted indication of which switches 22 are closed. The total current is measured and decoded by circuits 14 and 16 to provide the status of these switches.

This embodiment requires a DC voltage, but an AC voltage can be used if matching constant current devices are connected with opposite polarity in series with the devices 20. The matching constant current devices 26 are shown in phantom in FIG. 2. This embodiment requires the current measurement to be made better than one part in 256 or 0.39% accuracy and resolution.

Figure 3:
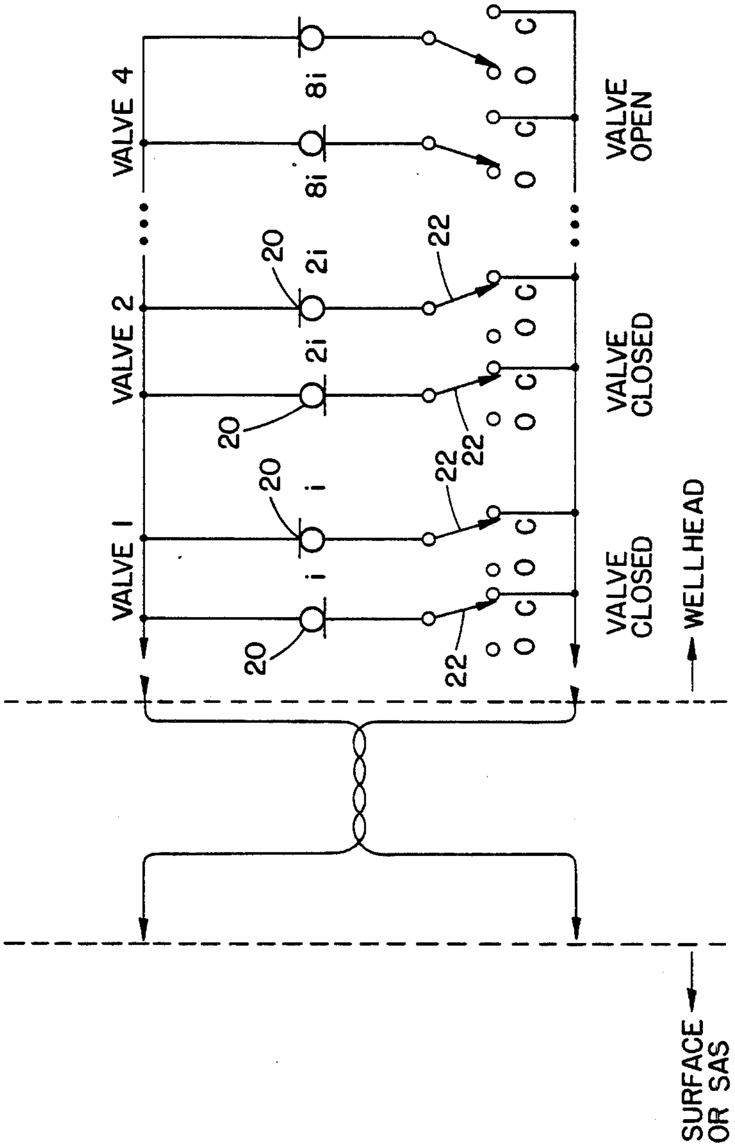
FIG. 3 is a schematic of an alternative embodiment of the network showed in FIG. 1.

In another embodiment, a bipolar current system is used to allow a reduction in the required current measurement resolution accuracy. This configuration, as shown in FIG. 3, requires a bipolar voltage source and a current measurement circuit to measure positive and negative currents. The constant current devices 20 connected to the valve limit switches 22 for the open valve position are connected in the opposite polarity as the devices 20 that are connected to the switches 22 for the closed valve position. The binary weighting insures that every combination of switch closures results in a unique level of current flow. The total current flowing for each polarity can therefore be decoded to indicate which switches are closed. Under steady state conditions of any combination of fully opened and fully closed valves, the signal on the cables and connectors is essentially AC if one normally open switch and one normally closed switch are used on each valve and the constant current devices for each valve are matched in current amplitude as shown.

Referring back to FIG. 1, the current measurement and decoding circuits 14 and 16 respectively, convert the analog current levels to digital signals to indicate the switch positions. The voltage source 18 can be made to interact with the current measurement circuit 14 to ensure that a voltage level sufficient for constant current operation is supplied without dissipating excessive power in the constant current devices 20. By using the constant current devices 20, series resistance and changes in series resistance in the cable and connectors have no effect if sufficient excitation voltage is used to overcome the resultant voltage drop.

The devices 20 may be any current regulator such as two terminal current regulator diodes or junction field-effect transistors with an internal gate to source connection. Three terminal current regulators that can be adjusted to regulate current over a wide range by changing the value of an external resistor may also be used. In addition, digitally programmable current regulators can be utilized. While these devices will function, they are typically limited to a maximum output current less than 10 milliamperes. In some applications, a current regulator with a higher output current rating is desirable to overcome the effects of cable leakage resistance.

Figure 4A:
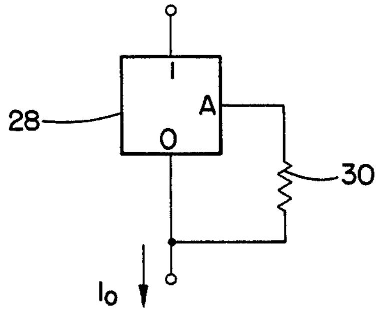
FIGS. 4*a*, 4*b* and 4*c* are schematics of alternative embodiments of the constant current devices.
Figure 4B:
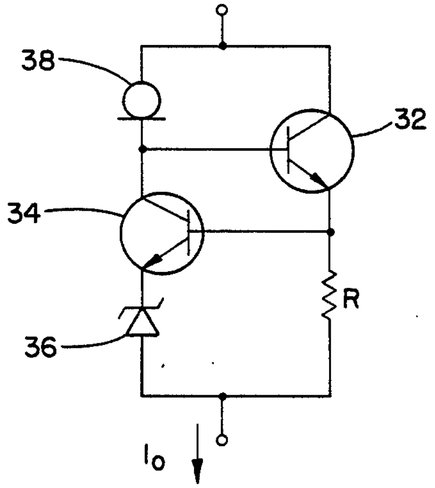
Figure 4C:
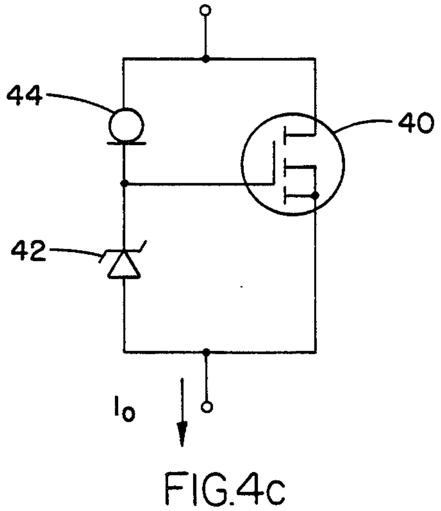

FIGS. 4*a*, 4*b* and 4*c* show three alternatives for higher current regulators 20. The first alternative, shown in FIG. 4*a*, uses a three-terminal voltage regulator integrated circuit 28 to regulate the current. This circuit maintains a constant voltage across a resistor 30, thereby regulating the output current $I_o$. The current regulation is very good with this circuit and drift caused by temperature is very low. If an integrated circuit with a 1.2-volt internal reference and a dropout voltage of 1.8 volts is used, the circuit will regulate current whenever the voltage across the circuit is greater than 3.0 volts. This low voltage requirement is important to minimize power dissipation in the circuit. A capacitor may be added to prevent unwanted oscillations when the circuit is driven over long cables. Suitable regulators of this type include the LM150 and LM117 manufactured by Motorola and National Semiconductor, and the LM138 manufactured by National Semiconductor.

The second alternative shown in FIG. 4*b*, uses discrete transistors 32 and 34 connected in a feedback configuration with a zener diode 36 and a constant-current diode 38. Many variations of the circuit shown in FIG. 4*b* are possible including substituting a Darlington transistor or power field-effect transistor for transistor 32, substituting a Darlington transistor for transistor 34, replacing transistor 34 and the zener diode 36 with a bandgap reference configuration, or connecting the zener diode 36 directly to the base of transistor 32 thereby eliminating transistor 34. The circuit of FIG. 4*b* can be designed to be very stable and provide sufficient current regulation as long as temperature drift is compensated for.

The third technique, shown in FIG. 4*c*, uses the constant current characteristic of a power field-effect transistor 40 connected to a zener diode 42 and a constant-current diode 44. The gate-to-source voltage of the transistor 40 is maintained constant. The current level at which regulation occurs is dependent upon the forward transconductance of the field-effect transistor 40. In addition, compensation must be made for temperature drift which will cause the current level to vary.

In the case of bipolar implementation, the constant current regulators 20 will be subjected to reverse voltage. For this reason, semiconductor diodes must be placed in series with each current regulator 20 to protect it from damage during reverse voltage conditions and to prevent reverse current flow.

Figure 5:
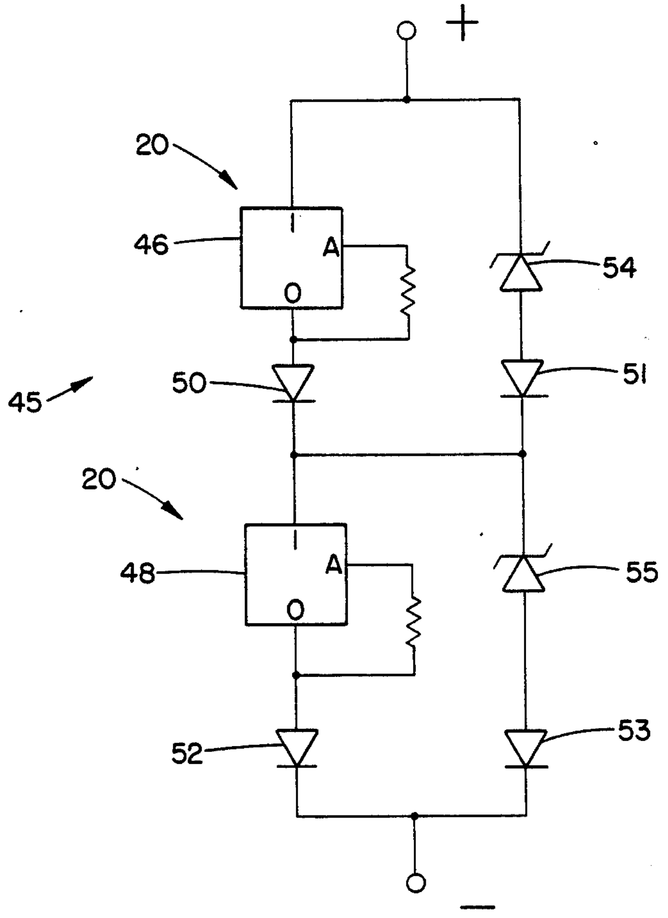
FIG. 5 is a schematic of a redundant implementation of the constant current regulator.

It is highly desirable to implement meaningful redundancy for the current regulators 20. Ideally, the failure of any component should not cause the system to fail to operate properly. Furthermore, the failure typically can occur in either the open circuit or the short circuit mode. FIG. 5 shows the preferred circuit 45 to implement this redundancy. Note that integrated circuits 46 and 48 form two current regulators 20 connected in series. Diodes 50, 51, 52 and 53 provide reverse voltage isolation. If either of the regulators 46 or 48 fail in the short circuit mode, the other regulator will maintain current regulation. Normally, zener diodes 54 and 55 do not conduct. However, if IC 46, diode 50, IC 48 or diode 52 fail in the open circuit mode the appropriate zener diode 54 or 55 will conduct and maintain proper operation with a higher input voltage requirement. The circuit 45 will continue to regulate current in the forward direction and block current flow in the reverse direction even though any component fails, including those added to implement redundancy.

Figure 6:
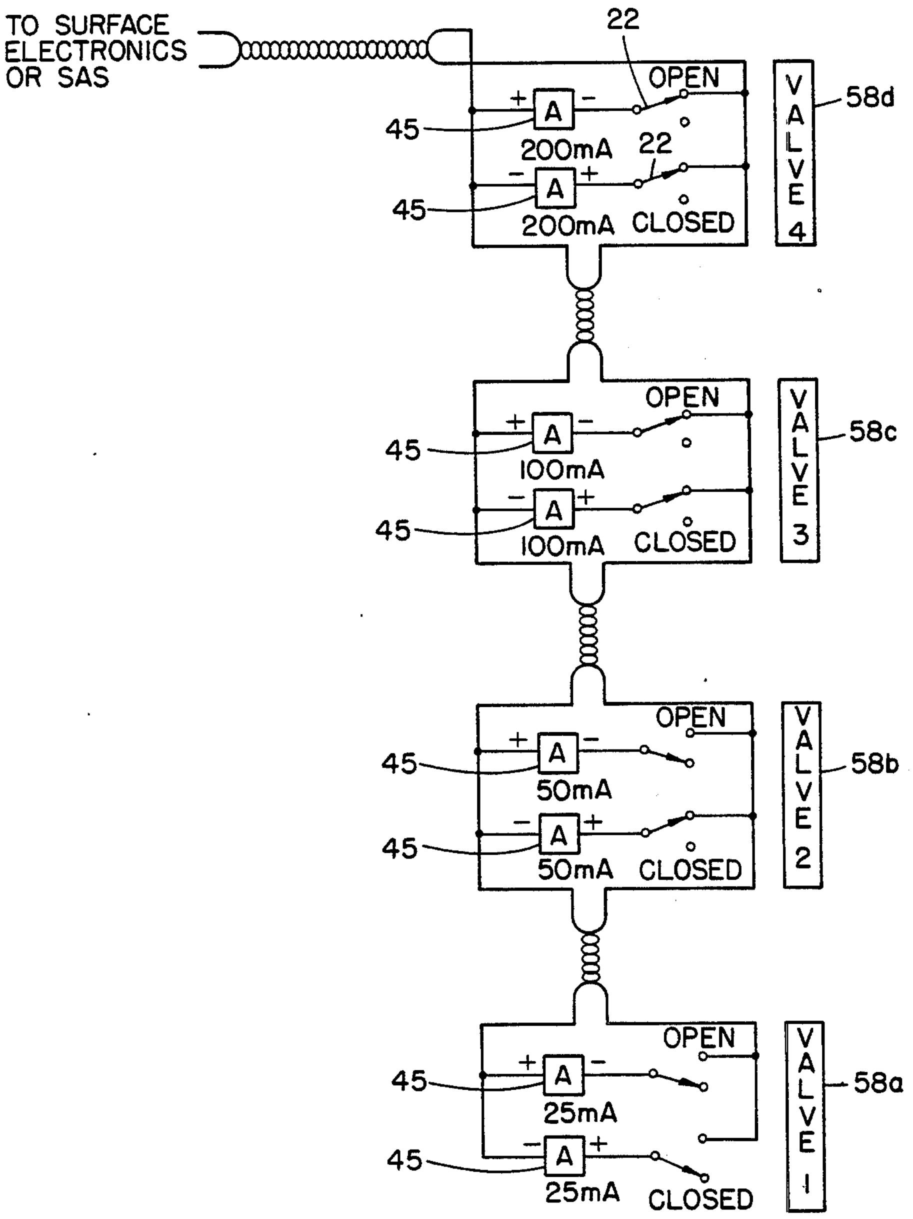
FIG. 6 is a schematic diagram of the preferred embodiment of the constant current encoding network.

The circuit connections for constant current encoding network 12 at the wellhead structure are shown in FIG. 6. Circuit 45 as shown in FIG. 5 is connected in alternating polarity to the valve limit switches 22 on each of the valves 58*a*, 58*b*, 58*c*, and 58*d*. As shown for valves 58*c* and 58*d*, when the valve is fully open, both limit switches are closed requiring a normally closed switch for the closed valve limit switch. When the valve is fully closed as shown for valve 58*a*, both limit switches are open. When the valve is neither fully open or fully closed, the open limit switch is open and the closed limit switch is closed as shown for valve 58*b*.

Figure 7:
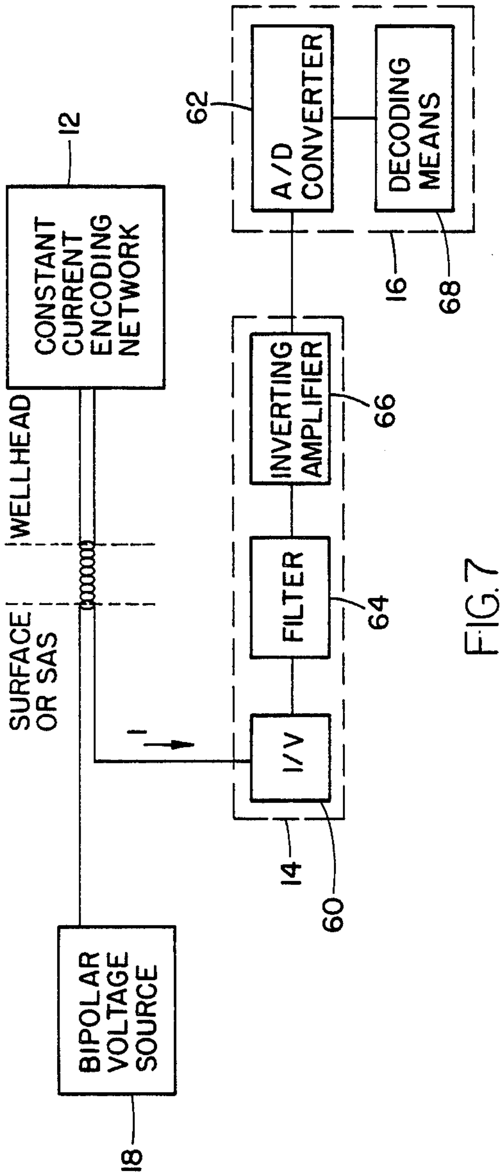
FIG. 7 is a block diagram of the system of the present invention showing the surface elements in more detail.

The total current from the constant current encoding network 12 must be accurately measured and converted to a digital form to indicate which valve limit switches are closed. FIG. 7 is a block diagram of the system 10 of the invention showing the components of the current measurement circuit 14 and the decoding circuit 16 in block form. The returning current I is converted to a voltage of proper amplitude by converting means 60. In the illustrative embodiment shown in FIG. 7, the output of the converting means 60 is filtered to reduce noise and interference by a filter circuit 64. The filter inverts the signal so that an inverting amplifier 66 is used to invert the signal to a positive polarity and also to amplify the signal to the proper amplitude.

Figure 8:
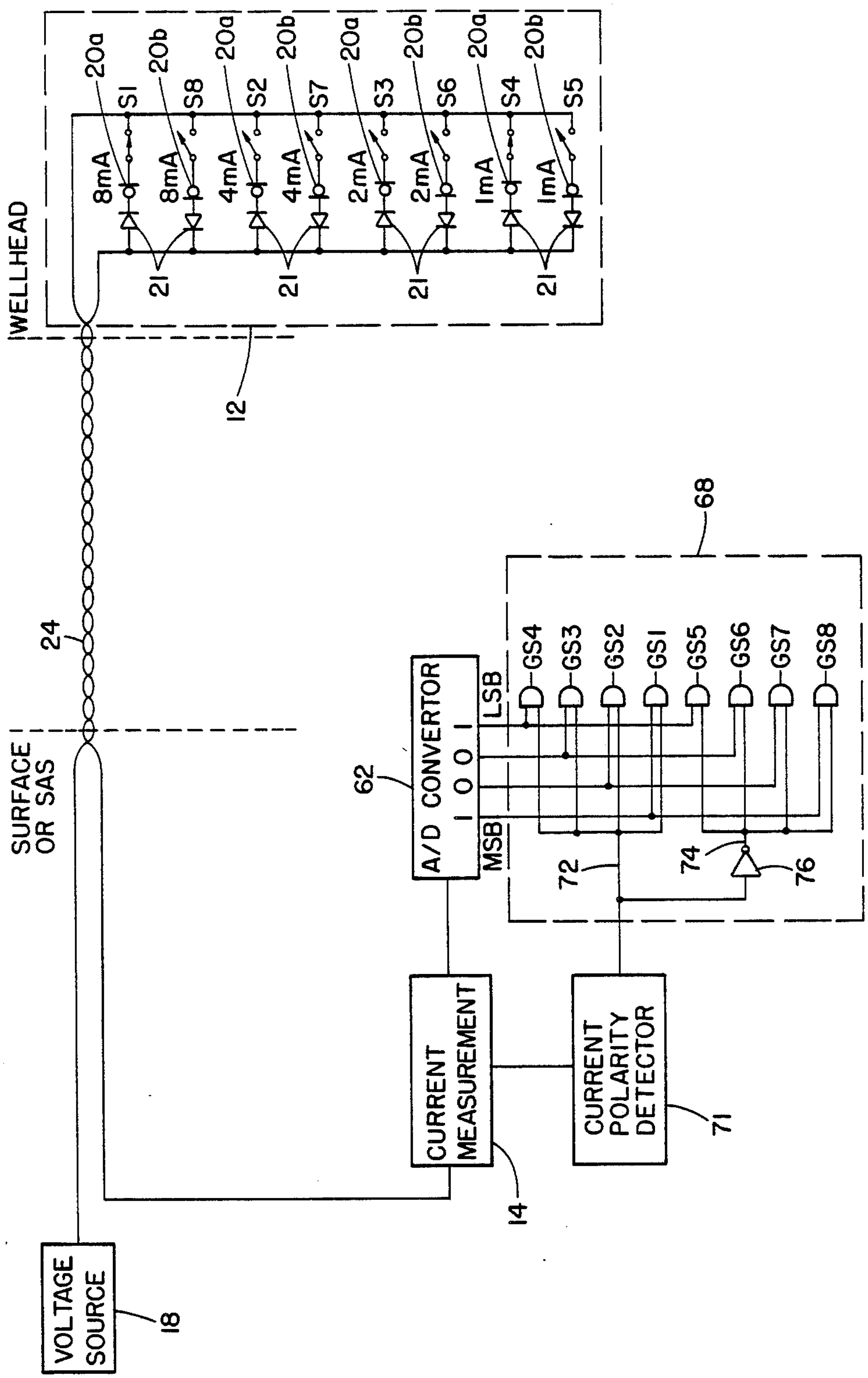
FIG. 8 is a block and schematic diagram of one embodiment of the decoding circuit.

The amplified voltage is connected to an analog to digital converter 62 to convert the signal to a digital form. The output of the analog to digital converter 62 is then decoded by a decoding means 68 to indicate which of the valve limit switches are closed. If the current leakage in the cable and connectors is negligible, a hardware decoding scheme as shown in FIG. 8 could directly indicate which switches are closed. However, since this may not be the case, it is preferable to perform the decoding with a computer 69 (See FIG. 9).

The decoding scheme in FIG. 8 includes eight AND gates GS1–GS8, one for each limit switch. The encoding network 12 at the wellhead includes switches S1 and S8 weighted at 8 milliamperes connected to valve 1, switches S2 and S7 weighted at 4 milliamperes connected to valve 2, switches S3 and S6 weighted at 2 milliamperes connected to valve 3, and switches S4 and S5 weighted at 1 milliampere connected to valve 4. The constant current diodes 20*a* are connected in series with switches S1, S2, S3, and S4 to conduct in one direction while constant current devices 20*b* are connected in series with switches S5, S6, S7, and S8 to conduct in the opposite direction. Diodes 21 are connected in series in the same direction with devices 20*a* and 20*b* respectively for reverse current protection. By way of example, assume that the switches S1 and S4 are closed. Assume also that the polarity of the current for the first measurement is such that the position of the switches S1, S2, S3 and S4 are being measured while S5, S6, S7 and S8 are not. Current polarity detector 71 is connected between current measurement circuit 14 and the gates GS1–GS8 for providing a high or low output depending on the polarity of the current. For the polarity of this example, the line 72 is at a high or binary 1. The inverter 76 maintains line 74 at the opposite value of line 72, in this case a low or binary 0. A low on line 74 provides a zero output for gates GS5 through GS8. The switches S1 and S4 being closed results in a total current of 9 milliamperes which is equivalent of the binary 1001. This provides a high on one input of GS1 and GS4 and combined with the high from line 72 on the other input results in an output of 1 for GS1 and GS4 thereby indicating that switches S1, S4 are closed. In the opposite polarity, the line 72 will be at 0 and 74 will be a 1 and the total current from switches S5, S6, S7 and S8 will be measured and decoded as 0000.

The voltage source 18 must provide sufficient voltage to overcome voltage drop in the cable, connectors, and current regulators 20. In addition, the voltage source 18 must provide a current greater than the sum of leakage current and the outputs of the current regulators 20. A digitally programmable power supply is desirable so that the voltage level can be automatically set to be just above the minimum level required for current regulation. A maximum output level of 375 milliamperes is required for the circuit shown in FIG. 6 if all the valves are open. To maintain current regulation with degradation in the contact resistance of the connectors, a voltage output level capability of at least 10 volts is needed. Several commercially available power supplies such as the Hewlett-Packard Model 6130C can meet these requirements. Redundancy for the power supply can be provided by operating multiple power supplies which can be selectively connected to a power bus under computer control.

Figure 10:
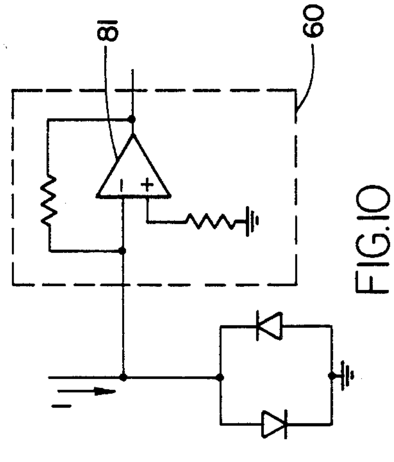
FIG. 10 is a schematic of an alternative circuit of the current to voltage converter.
Figure 9:
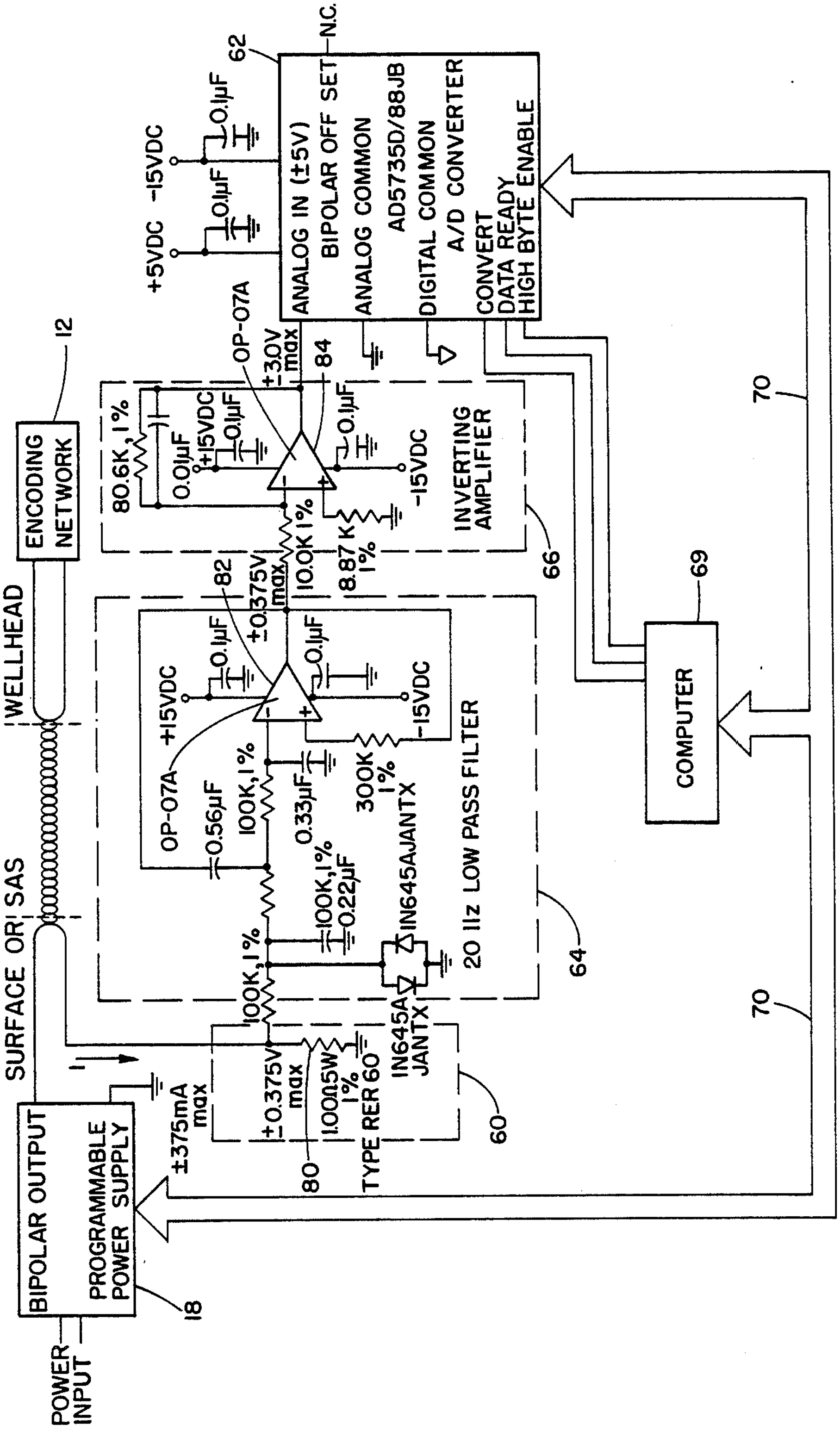
FIG. 9 is a schematic of one embodiment of the current measurement and decoding circuits.

A preferred embodiment of the surface or SAS electronics is shown in the schematic of FIG. 9. The circuit element values and catalog numbers are included in FIG. 9 as examples only as the value of the elements may be varied and the circuit will continue to perform the same function. The current I returning from the encoding network 12 is converted to a voltage by a 1-ohm resistor 80. An alternative to converting means 60 is shown in FIG. 10 wherein an op-amp 81 is used to convert the current to voltage. This voltage is filtered using a low pass filter 64 such as an active three-pole Bessel filter with a cutoff frequency in the range of 20 hertz. In addition, a low pass passive filter would also be applicable. Preferably, an OP-07A integrated circuit 82 is used to implement the filter 64 because it features an ultra-low offset voltage.

The cutoff frequency of the filter 64 is selected to provide adequate rejection of noise, transients, and interference from AC power frequencies while allowing lower frequency alternating current excitation of the current encoding network 12 and the current measurement circuit 14. The system operating frequency must be high enough to prevent electrolysis and subsequent corrosion of the cable and connector conductors. Furthermore, the status indication of the valves must be updated at suitable intervals. These requirements can be met with the system of the present invention. A complete excitation/measurement cycle for the system can be accomplished in approximately 0.2 seconds.

The signal at the output of the low pass filter 64 is amplified by an inverting amplifier 66 implemented with another OP-07A operational amplifier 84. The gain of the amplifier 84 is selected to provide 3 volts output when the regulator return current is at the maximum normal value of 375 milliamperes. The output of the amplifier 84 is connected to the analog input of the analog-to-digital converter 62.

To provide the computer 69 with data of sufficient resolution to be able to compensate for leakage currents, the current must be measured to an accuracy greater than the 5-bit resolution necessary to uniquely indicate which switches are closed. Eight-bit resolution was selected since this resolution is available in most analog-to-digital converters. In the illustrative embodiment, an AD5732D/883B analog-to-digital converter manufactured by Analog Devices is used.

The A/D converter 62 is connected to accept a bipolar input range of +4.96 volts to −5.0 volts. Since the normal input is limited to ±3.0 volts, the extra range is available to measure a significant amount of excess current caused by cable and connector leakage. The AD573 A/D converter contains an internal reference and clock and can be easily interfaced to a data bus 70. Conversion is initiated by supplying a CONVERT signal to one of the control inputs. A DATA READY signal goes low to signal when the analog-to-digital conversion is complete. A HIGH BYTE ENABLE signal can be supplied to another control input to control the 8-bit three state output buffer for multiplexing the digital outputs onto the data bus 70. When the bipolar offset control pin is left open, the +4.96 to −5.00 volt inputs are converted to an offset binary output code. A −5.00 volt signal will give an 8-bit code of 00000000; an input of 0.00 volts results in an output code of 10000000 and +4.96 volts at the input yields the 11111111 output code. These codes can easily be converted and scaled by the computer 69 to determine the polarity and magnitude of the input current. The computer 69 can then decode the current to indicate the status of the valves.

Redundancy of the current measurement circuitry can be provided by connecting the input of one or two additional current measurement circuits across the current measurement resistor 80 and connecting the A/D converter 62 control and output lines to the data bus 70. The computer 69 would then read each set of outputs and determine the correct outputs using a voting or error recognition procedure.

Figure 11:
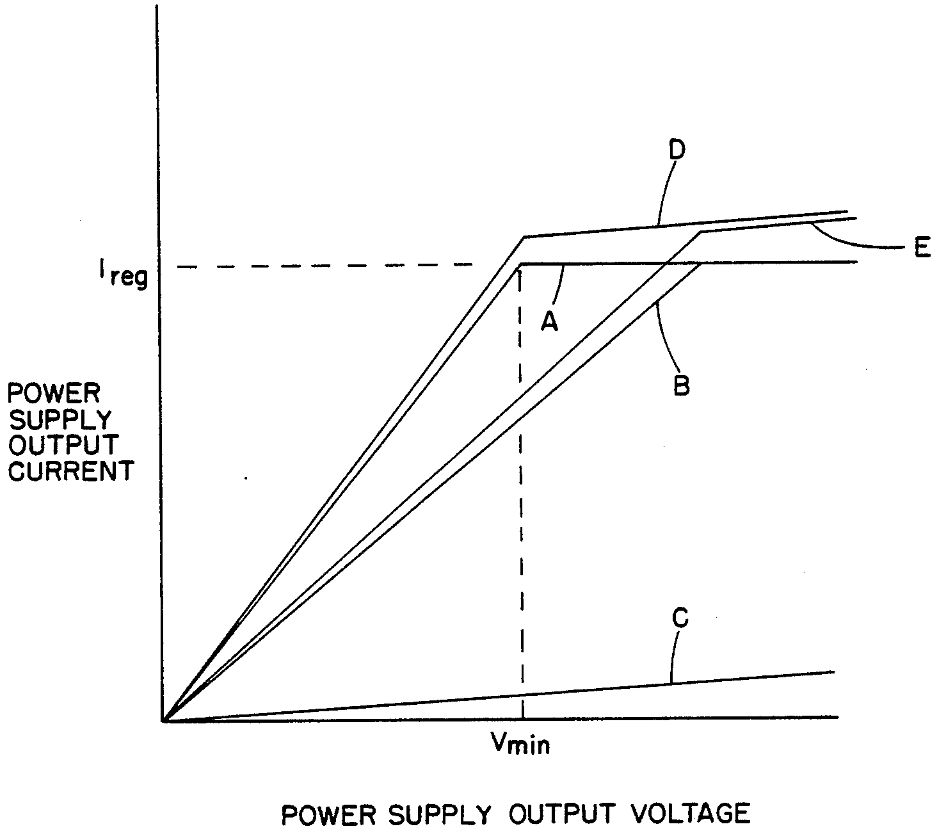
FIG. 11 is a graph showing the effect of series and shunt resistances on current measurement.

The system must periodically calibrate itself to correct for offset voltages and the effects of increasing connector contact resistance and to overcome the effects of increasing cable and connector leakage resistance. The effect of changes in the series and shunt resistances is shown in FIG. 11. Curve A shows the normal response of current versus voltage in which current is regulated at $I_{reg}$ whenever the input voltage is greater than $V_{min}$. Curve B illustrates the additional voltage required for current regulation when the series resistance is increased. Curve C plots the contribution due solely to shunt resistance. The effect of shunt resistance is shown in Curve D as being the sum of Curves A and C. The combined effect of series and shunt resistances is shown in Curve E. Note that the effects of series and shunt resistances tend to partially cancel each other.

The curves indicate that the power supply voltage must be increased to the point where current regulation occurs. This can be accomplished under computer control by incrementing the power supply until the resulting current level is maintained relatively constant.

A first order approximation to compensating for the effect of shunt resistance is to close all of the valves so that none of the current regulators are connected. The leakage resistance is then quantized by measuring the current with a fixed output voltage. This measurement then allows a linear correction factor to be subtracted from the measured response.

More accurate calibration schemes are possible in which the current versus voltage curve is quantized and the distributed series and shunt resistances are mathematically modeled. A mathematical inversion is then performed to solve for the distribution of series and shunt resistances. The effect of these resistances is then subtracted from the measured response.

Another method for calibration is where the slopes of the measured curve at low and at high voltages are used to solve for approximate values of series and shunt resistances. The effect of these resistances can be subtracted from the measured current.

In the embodiment shown in FIG. 9, the computer 69 will control the calibration and measurement sequences. It may also be desirable to put the system in a standby mode at times when it is not necessary to determine the position of the production valves. The overall sequencing of calibration, measurement, and standby will depend upon the calibration procedure selected. Assuming a calibration sequence has determined the required excitation voltage and has determined the parameters needed to compensate for offset and the effect of series and shunt resistances, a typical measurement sequence will proceed as follows:

1. Connect the power supply control lines to the data bus.
2. Enable the power supply in the positive voltage polarity.
3. Latch the power supply control inputs.
4. Wait approximately 50 milliseconds to allow for filter response time.
5. Connect the A/D converter control and output lines to the data bus.
6. Supply a CONVERT signal to the A/D converter.
7. Upon receipt of a DATA READY SIGNAL from the A/D converter, supply a HIGH BYTE ENABLE signal to the A/D converter.
8. Read the A/D converter output data bits into the computer.
9. Convert the data bits into the equivalent current.
10. Apply the calibration factors to determine the regulator current more accurately.
11. Decode the current level to determine which valve limit switches are closed.
12. Check for and indicate error conditions such as a valve is indicated to be fully open and fully closed simultaneously.
13. Repeat steps 1 through 12 for the negative voltage polarity.
14. Repeat steps 1 through 13. If the present valve position indication is the same as a number of previous consecutive cycles, update the switch position status.

The sequence listed above will provide a running check to make it very difficult for an incorrect spurious indication to occur.

While illustrative embodiments of the subject invention have been described and illustrated, it is obvious that various changes and modifications can be made therein without departing from the spirit of the present invention which should be limited only by the scope of the appended claims.

What is claimed is:

1. A system for sensing the position of a plurality of switches comprising;

a constant current encoding network including a plurality of current encoded switches hvaing constant current means operatively connected to each of said switches, each of said constant current means having a distinct current weighting;

current measurement means operatively connected to said constant current encoding network by a two conductor line for measuring the total current of said constant current encoding network;

means for supplying a voltage to said constant current encoding network; and decoding means operatively connected to said current measurement means for deriving digital output data indicative of the position of each of said switches.

2. The system of claim 1 wherein each of said constant current means having a distinct binary current weighting.

3. The system of claim 2 wherein said encoding network includes a plurality of series circuits each having one of said constant current means connected in series with one of said switches and wherein each of said series circuits are connected in parallel with said two conductor line.

4. The system of claim 3 wherein said means for supplying a voltage includes a DC voltage source.

5. The system of claim 3 wherein each of said constant current means includes a first constant current diode.

6. The system of claim 5 wherein each of said series circuits includes a second constant current diode connected in the opposite polarity as said first constnt current diode, and wherein said means for supplying a voltage includes an AC voltge source.

7. The system of claim 6 wherein said first and second constant current diodes in each series circuit are of matching binary current weighting.

8. The system of claim 3 wherein a first half of said series circuits has said constant current means connected in the opposite polarity as the constant current means in the second half of said series circuits.

9. The system of claim 8 wherein said means for supplying a voltage includes a bipolar voltage source.

10. The system of claim 8 wherein the switches in said first half of said series circuits are normally open and the switches in said second half of said series circuits are normally closed.

11. The system of claim 8 wherein said current measurement means includes a bipolar current measurement circuit.

12. A system for sensing at the surface or at a subsea control chamber, the position of a plurality of valves on a subsea wellhead, each of said valves having a first switch to detect when the valve is closed and a second switch to detect when the valve is open, said system comprising;

a constant current encoding network located at said wellhead including a plurality of series circuits each having a constant current means connected in series with one of said switches, each of said series circuits being connected in parallel with a two conductor line, said constant current means connected to said first switch on each of said valves being of opposite polarity as said constant current means connected to said second switch on each of said valves, each of said constant current means having a distinct binary current weighting;

current measurement means located at said surface or said subsea control chamber, operatively connected to said constant current encoding network by said two conductor line for measuring the total current of said constant current network;

means for supplying a voltage to said constant current encoding network, said voltage means interacting with said current measurement means, and decoding means operatively connected to said current measurement means for deriving digital output data indicative of the position of each of said switches thereby determining the position of each of said valves.

13. The system of claim 12 wherein one switch on each of said valves is normally open and the other switch on each of said valves is normally closed.

14. The system of claim 12 or 13 wherein the constant current means connected to the first and second switches of each of said valves are matched in binary current weighting and wherein the current for each valve is twice the current for each preceding valve.

15. The system of claim 13 wherein said normally open switch is connected to indicate the open position and said normally closed switch is connected to indicate the closed position of each of said valves.

16. The system of claim 1 or 12 wherein said constant current means are current regulators.

17. The system of claim 16 wherein said current regulators are three terminal voltage regulator integrated circuits having an external resistor connected for constant current operation.

18. The system of claim 16 wherein said current regulators include a circuit having discrete transistors connected in a feedback configuration to provide constant current.

19. The system of claim 18 wherein said current regulators include a power field-effect transistor.

20. The system of claim 17 wherein a diode is placed in series with said three terminal voltage regulator.

21. The system of claim 1 or 12 wherein said constant current means includes a redundancy circuit for protecting against system breakdown due to component failure.

22. The system of claim 21 wherein said redundancy circuit includes a first circuit having a three terminal voltage regulator integrated circuit with an external resistor connected for constant current operation, a first diode connected in series with said voltage regulator, a zener diode connected in parallel with said voltage regulator and diode with zener current conducting in the same direction as said first diode and a second diode in series with said zener diode conducting current in the same direction as the zener current of said zener diode; and a second circuit identical to said first circuit connected in series with said first circuit.

23. The system of claim 1 or 12 wherein said voltage source is a digitally programmable power supply.

24. The system of claim 1 or 12 wherein said current measurement means includes a converting means connected to said two conductor line for converting the current of said constant current network to a voltage and an amplifier circuit connected to said converting means.

25. The system of claim 24 wherein said current measurement means includes a filter circuit connected between said converting means and said amplifier circuit.

26. The system of claim 24 wherein said converting means includes a resistor.

27. The system of claim 26 wherein said converting means includes an operational amplifier.

28. The system of claim 25 wherein said filter circuit includes a low pass filter and wherein said filter is implemented by an operational amplifier.

29. The system of claim 25 wherein said filter circuit includes a low pass passive filter.

30. The system of claim 1 or 12 wherein said decoding means includes an analog to digital converter.

31. The system of claim 24 wherein said decoding means includes an analog to digital converter connected to said amplifier circuit.

32. The system of claim 30 wherein said decoding means further includes a gating circuit for decoding the output signal of said analog to digital converter to determine the status of each switch.

33. The system of claim 30 wherein said decoding circuit further includes a computer for decoding the output signal of said analog to digital converter to determine the status of each switch.

34. A method of sensing the position of a plurality of switches comprising;

current encoding each of said switches;

connecting each of said current encoded switches to a two conductor line;

applying a voltage across said two conductor line;

measuring the current output of said switches in said two conductor line;

decoding said current output to indicate the position of each of said switches.

35. The method of claim 34 wherein said current encoding includes the steps of connecting a constant current device of different binary weighting in series with each of said switches thereby forming a plurality of series circuits and connecting said series circuits in parallel with said two conductor line.

36. The method of claim 34 wherein said current output measuring includes the step of converting said current output to a voltage.

37. The method of claim 36 further including the steps of filtering said converted voltage and amplifying said voltage.

38. The method of claim 34 wherein said decoding includes the steps of converting said current output to a digital signal and logically decoding said digital signal.

39. The method of claim 36 or 37 wherein said decoding includes the steps of converting said voltage to a digital signal and logically decoding said digital signal.

40. The method of claim 38 wherein said digital signal is logically decoded by a computer.

41. The method of claim 39 wherein said digital signal is logically decoded by a computer.

42. The method of claim 36 further including the step of calibrating said output current to compensate for leakage resistance in the two conductor line.

43. In a system for sensing the position of a plurality of valve limit switches including a circuit for measuring the total current of said switches, a filter for filtering the signal from each measurement circuit, an analog to digital (A/D) converter for converting said filtered signal to a digital form, a computer for decoding the digital signal, a power supply connected to said switches and a data bus connecting said power supply and said analog to digital converter to said computer, the method of measuring and decoding said current comprising:

(1) connecting the power supply control lines to the data bus;

(2) enabling the power supply in the positive voltage polarity;

(3) latching the power supply control inputs;

(4) waiting a period of time to allow for filter response time;

(5) connecting the A/D converter control and output lines to the data bus;

(6) supplying a CONVERT signal to the A/D converter;

(7) receiving at said computer a DATA READY SIGNAL from the A/D converter;

(8) reading the A/D converter output data bits into the computer;

(9) accurately converting the data bits into the equivalent current;

(10) applying calibration factors to determine the regulator current more accurately;

(11) decoding the current level to determine which valve limit switches are closed;

(12) checking for error conditions; and

(13) repeating steps 1 through 12 for the negative voltage polarity.

* * * * *